(12) United States Patent
Francis et al.

(10) Patent No.: US 9,644,856 B1
(45) Date of Patent: May 9, 2017

(54) SYSTEM AND METHOD FOR MONITORING AND CONTROLLING AN HVAC SYSTEM

(71) Applicant: System Performance Technologies, LLC, Burkburnett, TX (US)

(72) Inventors: Brian Mark Francis, Burkburnett, TX (US); Donald Raymond Rosentreter, Edmund, OK (US); Dan Lee Keown, Burkburnett, TX (US)

(73) Assignee: System Performance Technologies, LLC, Burkburnett, TX (US)

( * ) Notice: Subject to any disclaimer, the term of this patent is extended or adjusted under 35 U.S.C. 154(b) by 0 days.

(21) Appl. No.: 14/926,524

(22) Filed: Oct. 29, 2015

Related U.S. Application Data

(63) Continuation-in-part of application No. 14/811,806, filed on Jul. 28, 2015, now abandoned.

(60) Provisional application No. 62/030,025, filed on Jul. 28, 2014.

(51) Int. Cl.
*G05B 15/02* (2006.01)
*F24F 11/00* (2006.01)

(52) U.S. Cl.
CPC ............ *F24F 11/006* (2013.01); *G05B 15/02* (2013.01); *F24F 2011/0046* (2013.01); *F24F 2011/0047* (2013.01); *F24F 2011/0075* (2013.01); *F24F 2011/0093* (2013.01); *Y04S 20/244* (2013.01)

(58) Field of Classification Search
None
See application file for complete search history.

(56) References Cited

U.S. PATENT DOCUMENTS

| | | | | |
|---|---|---|---|---|
| 5,743,100 | A | * | 4/1998 | Welguisz ........... G05D 23/1919 236/46 F |
| 6,385,510 | B1 | | 5/2002 | Hoog et al. |
| 8,704,672 | B2 | | 4/2014 | Hoglund et al. |
| 9,092,040 | B2 | * | 7/2015 | Fadell .................. F24F 11/0012 |
| 9,328,933 | B2 | * | 5/2016 | Walsh ................. F24D 19/1084 |

(Continued)

FOREIGN PATENT DOCUMENTS

JP   WO 2013/125263   *   8/2013   .......... F24F 11/0012

OTHER PUBLICATIONS

Author: Lipski, Marc, Title: Demand Response—Technology for the Smart Grid, Date: May 2011, Publisher: Electricity Today, Country: USA.

*Primary Examiner* — Sean Shechtman
(74) *Attorney, Agent, or Firm* — Eric Karich; Karich & Associates

(57) ABSTRACT

A system and method for monitoring and controlling an energy demand by an HVAC system utilizes a control device that is operably installed in the HVAC system. The system performs the following steps: receiving, in a control device, values of one or more parameters related to performance of the plurality of powered components; comparing the received values with corresponding predetermined threshold values; determining overloading of the electrical grid by a powered component based on respective values of one or more parameters being less than the corresponding predetermined threshold values for the powered component; and selectively controlling the operation of the powered component without disrupting operation of the remaining plurality of powered components.

8 Claims, 7 Drawing Sheets

(56) References Cited

U.S. PATENT DOCUMENTS

| | | | | |
|---|---|---|---|---|
| 2008/0110040 A1* | 5/2008 | Repossi | ................ | A45D 20/30 |
| | | | | 34/96 |
| 2010/0114385 A1* | 5/2010 | Dempster | .............. | G05B 15/02 |
| | | | | 700/276 |
| 2015/0013958 A1* | 1/2015 | Kubo | .................. | F24F 11/0012 |
| | | | | 165/237 |
| 2015/0354867 A1* | 12/2015 | Bloch | ....................... | F24F 7/08 |
| | | | | 62/333 |

* cited by examiner

SYSTEM AND METHOD FOR MONITORING AND CONTROLLING AN HVAC SYSTEM

CROSS-REFERENCE TO RELATED APPLICATIONS

This application for a utility patent is a continuation-in-part of a previously filed utility patent, having the application Ser. No. 14/811,816, filed Jul. 28, 2015, which claims the benefit of U.S. Provisional Application No. 62/030,025, filed Jul. 28, 2014, the contents of which are incorporated by reference in full.

BACKGROUND OF THE INVENTION

Field of the Invention

This invention relates to systems and methods for monitoring and controlling HVAC systems, and more particularly to a system which continuously monitors the HVAC system and determines if maintenance is required.

Description of Related Art

It is important to maintain heating, ventilating, and air conditioning (HVAC) systems in good working order to maintain optimum energy efficiency. Clogged filters reduce the ability of the HVAC system to circulate air, reducing effectiveness and requiring more energy. As it is generally difficult to determine the condition of a filter, most filter replacements are performed on a time basis, or a total-operating-hours basis. This can lead to a loss of efficiency if the filter becomes clogged unusually quickly (for example, due to heavy pollution in the area), or a wasted filter replacement if the filter has not yet become significantly clogged.

The prior art teaches filter sensor systems that can determine and report when a filter becomes clogged by monitoring changes in current and voltage. Keown, U.S. Pat. No. 6,842,117, teaches a filter condition sensing circuit is disclosed including current and voltage sensors and a computer processor. The current and voltage sensors produce signals indicating magnitudes of electrical current and voltage, respectively, provided to an electric motor used to move a fluid (a gas or liquid) through a filter element. During a first time period, the computer processor uses the signals to determine an acceptable range of electrical power required by the motor. During a second time period, the computer processor uses the signals to determine a magnitude of electrical power required by the motor. When the magnitude of electrical power is within the acceptable range of electrical power, the computer processor generates a signal indicating a normal condition of the filter element.

While this reference teaches monitoring the system, it is not able to take any action itself in the event of the filter becoming clogged, it can only report that the filter requires replacement.

In addition to monitoring the condition of the filter associated with the HVAC system, it is also important to monitor the status of the system itself, to detect mechanical problems that can lead to inefficient operation and also to failure of the system.

Other prior art systems measure other parameters of the HVAC system to determine the operational efficiency of the system, and to report potential mechanical problems, based upon measured differences in temperature. For example, Hoog et al., U.S. Pat. No. 6,385,510, teaches an HVAC monitoring computer that monitors the condition and efficiency of the HVAC system based upon measured differences in temperature (input vs, output), and notifies a central computer when the condition or efficiency falls below a certain industry standard.

While this prior art system teaches the monitoring of the HVAC system, it does not enable active control over the system. The present invention teaches a system that enables monitoring of the HVAC system similar to the prior art device, but also enables active control over the system using existing network architecture, as described in the following summary.

SUMMARY OF THE INVENTION

The present invention teaches certain benefits in construction and use which give rise to the objectives described below.

The present invention provides a system and method for monitoring and controlling an HVAC system. The system has a control device to monitor the HVAC system to ensure that the system operates as energy efficiently as possible, and that maintenance is performed at suitable times. The device controls the HVAC system and is able to turn off or otherwise control components of the HVAC system responsive to maintenance status.

A primary objective of the present invention is to provide a system and method for monitoring and controlling an HVAC system, the system having advantages not taught by the prior art.

Another objective is to provide a control device for monitoring the efficiency and/or efficacy of the system.

A further objective is to provide a control device for monitoring the status of a filter of the HVAC system, and/or other similar components of the system.

A further objective is to provide a control device for controlling the operation of the HVAC system, and/or various components of the system, responsive to the efficiency and/or efficacy of the system, and/or the status of the filter and/or other similar components.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a system 10 for monitoring and controlling an HVAC system 100.

Figure 1:
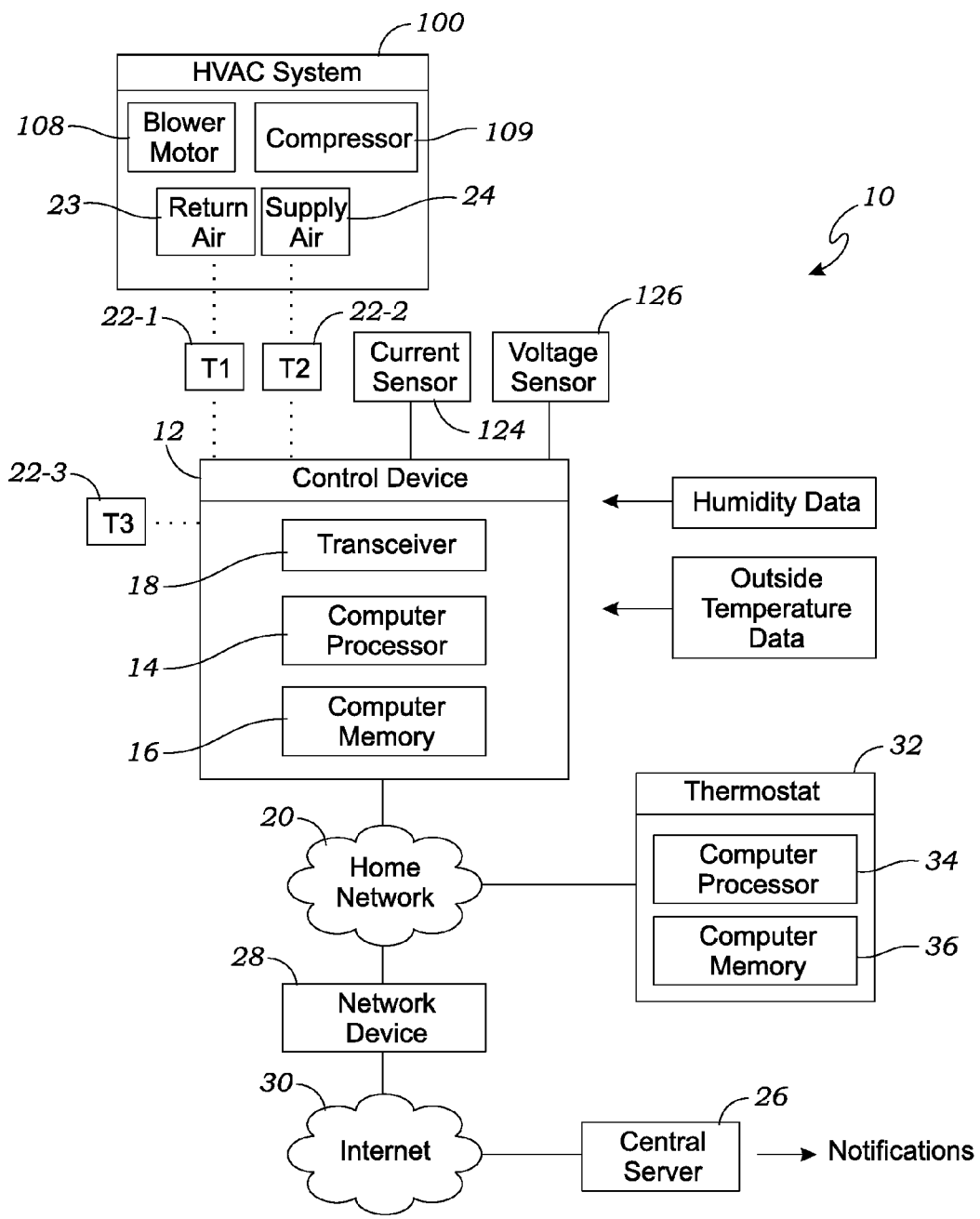
FIG. 1 is a block diagram of one embodiment of a system for monitoring and controlling an HVAC system.

FIG. 1 is a block diagram of one embodiment of the system 10 for monitoring and controlling the HVAC system 100. The HVAC system 100 includes standard components, such as a blower motor 108 and a compressor 109, as well as any other powered components that may be required, or associated with the HVAC system 100. As shown in FIG. 1, the system 10 includes a control device 12 that includes a computer processor 14 and a computer memory 16 that includes the software for monitoring and controlling the HVAC system 100.

The control device 12 includes one or more computer devices that include executable code that, when executed, enables the system 10 to perform processes that are described in greater detail below. The processor 14 may include, for example, microprocessors, microcomputers, microcontrollers, digital signal processors, central processing units, state machines, logic circuits, and/or any devices that manipulate signals based on operational instructions. Among other capabilities, the processor 14 may be configured to fetch and execute computer readable instructions in a memory 16 associated with the control device 12 for performing tasks such as signal transcoding, data processing, input/output processing, power control, and/or other functions. The computer memory 16 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. In some embodiments, the computer memory 16 may be installed on, integrated with, or operatively connected to a server such as a server 26, as illustrated and discussed below.

The control device 12 may include a variety of known, related art, or later developed interface(s) (not shown), including software interfaces (e.g., an application programming interface, a graphical user interface, etc.); hardware interfaces (e.g., cable connectors, a keyboard, a card reader, a barcode reader, a biometric scanner, an interactive display screen, a monitor, etc.); or both.

In the embodiment of FIG. 1, the control device 12 further includes a transceiver 18 (i.e., any known network connection device) that may be used to wirelessly communicate with a network, in this embodiment with a home network 20 that is established in a home, business, or other suitable location. The home network 20 may include, for example, one or more of the Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 20 may include multiple networks or subnetworks, each of which may include, for example, a wired or wireless data pathway. The network 20 may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The control device 12 may be operably connected to various sensors for gathering the necessary data, as discussed in greater detail below. In this embodiment, there are three temperature sensors T1 22-1, T2 22-2, and T3 22-3 (collectively, temperature sensors 22), as well as a current sensor 124 and a voltage sensor 126. As shown in FIG. 1, the temperature sensors 22 in this embodiment are operably positioned to gather required data. In this embodiment, a first temperature sensor T1 22-1 is positioned adjacent a return air 23 (e.g., duct) of the HVAC system 100, a second temperature sensor T2 22-2 is positioned adjacent a supply air 24 (e.g., duct) of the HVAC system 100, and a third temperature sensor T3 22-3 is positioned outside of the home or other structure, to determine the outside temperature. In alternative embodiments, the temperature sensors 22 may be placed elsewhere for determining operational efficiency of the HVAC system 100.

Temperature readings from the plurality of temperature sensors 22, and in particular changes in the differences ($\Delta T$) between the first temperature sensor T1 22-1 and the second temperature sensor T2 22-2, are useful for determining, from the temperature readings, the operational efficiency of the HVAC system 100. Changes in the $\Delta T$ of the temperatures may be used to determine operational efficiency of the system 10. If the readings indicate that the HVAC system 100 falls below a threshold efficiency, such as from a mechanical failure or other cause, the system 10 selectively controls the operation of the HVAC system 100 to turn off power to at least some of the powered components, such as the compressor 109.

The current sensor 124 and the voltage sensor 126 are operably connected with the HVAC system 100, as discussed below in more detail, for monitoring the operation of the HVAC system 100. Other sensors may also be included, such as humidity sensing equipment (not shown), further sensors for monitoring vibration, harmonics, other temperature sensors, etc., along with any other sensors known in the art that may be useful for the function of the system. In this embodiment, humidity data and outside temperature data is gathered from existing systems (not shown) by the central server 26 (and/or the third temperature sensor T3 22-3) and transmitted via a network device 28 to the control device 12 over an external network 30, which may be a public network (e.g., the Internet). Examples of the network device 28 may include, but are not limited to, a DSL modem, a wireless access point, a set-top box (STB), a router, a base station, and a gateway having a predetermined computing power sufficient for seamlessly communicating with other networked devices and networks using any suitable protocols known in the art, related art, or developed later.

In the embodiment of FIG. 1, the HVAC system may further include a thermostat 32 that includes a computer processor 34 and a computer memory 36. The thermostat 32 enables the control device 12 to operably control the HVAC system, as discussed in greater detail below, over the home network 20 or in some embodiments, the public network such as the Internet.

In some embodiments, the control device 12 may be integrated, installed on, or operatively associated with the HVAC system or the central server 26 in communication with the HVAC system. The central server 26 may be implemented using any of a variety of computing devices including, for example, a general purpose computing device, multiple networked servers (arranged in clusters or as a server farm), a mainframe, or so forth, with any arrangement of processors and memory devices that are determined suitable by one skilled in the art. The server 26 may receive indications such as notifications or alerts (which may be audio, visual, haptic, or any combination thereof) from the control device 12 regarding the operation of the HVAC system itself or various units or components associated with the HVAC system.

In one embodiment, the central server 26 may be controlled by a power company, government authority or agency, or other suitable entity, and the central server 26 is able to selectively turn off any of the powered components (i.e., the blower motor 108, the compressor 109, etc.) necessary in the event of a power outage. Priority may be determined in a variety of manner, taking into account various factors. Some homes may be given priority for deactivation if they have agreed to receive early termination of service in the event of a power shortage (for example, in exchange for lower pricing, or other rewards).

Priority may also be given in relation to the efficiency of the equipment. For example, if the system 10 determines that a given compressor 109 is operating at a low efficiency due to lack of maintenance, it may be selected for deactivation in advance of another home that has properly maintained their HVAC system 100. Similarly, an indication that a filter has not been changed, and the system is therefore operating at lower efficiency, may result in the system 10 receiving early shutdown in the event of a power shortage. This arrangement results in the homeowners having incentives to maintain their HVAC systems 100 in good operating order, operating with maximum efficiency, and therefore lowering the load on the power grid.

Figure 2:
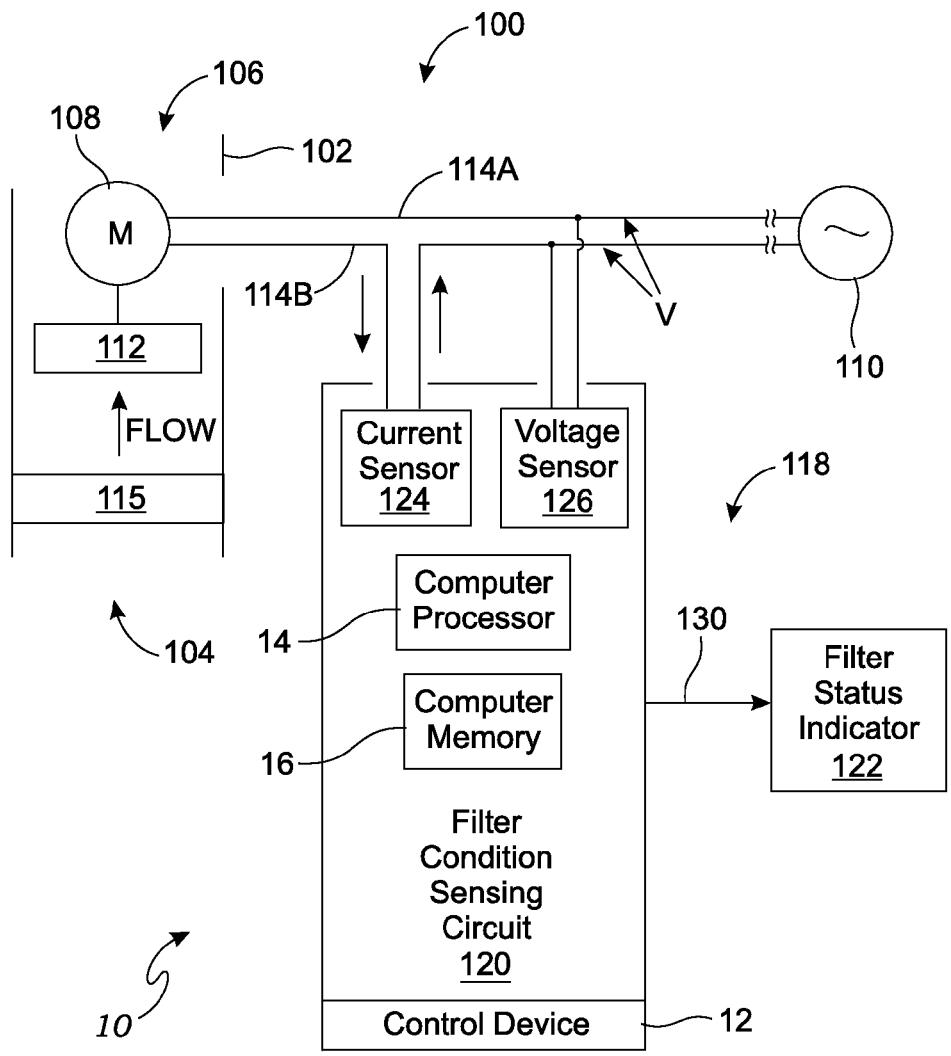
FIG. 2 is a block diagram illustrating the operative connection of a current sensor and a voltage sensor of the system of FIG. 1 with the HVAC system.

FIG. 2 is a block diagram of the HVAC system 100 illustrating an operative connection of the current sensor 124 and the voltage sensor 126 of the system 10. The HVAC system 100 includes a housing 102 having a fluid inlet 104 and a fluid outlet 106. Within the HVAC system 100, the fluid flows from the fluid inlet 104 to the fluid outlet 106 as indicated in FIG. 2. For purposes of this application, the term "HVAC system" is defined to include any form of air heating or cooling devices, and also any form of related liquid heating or cooling, refrigeration system, and other structurally similar or related systems that require monitoring and maintenance.

The HVAC system 100 includes a fluid flow producing device 112 for producing a flow in the fluid from the fluid inlet 104 to the fluid outlet 106. As indicated in FIG. 2, the fluid flow producing device 112 is connected to an electric motor 108. The motor 108 is connected to an alternating current (a.c.) power source 110 via a pair of conductors 114A and 114B (collectively, conductors 114). It is noted that a connection device, e.g., a switch or relay, (not shown) would also expectedly exist between the motor 108 and the a.c. power source 110.

In general, the motor 108 converts electrical energy from the a.c. power source 110 to mechanical energy. The fluid flow producing device 112 is actuated (i.e., driven) by the motor 108, and the fluid flow producing device 112 operates when the motor 108 operates.

As is typical, the motor 108 has a shaft (not shown) that rotates when the motor 108 is operating. The fluid flow producing device 112 is connected to the shaft, and is operated by the rotating shaft. For example, the fluid flow producing device 112 may rotate when operating, and may be connected to the shaft of the motor 108 either directly or via a belt, chain, or gear drive mechanism. The fluid flow producing device 112 may be, for example, a fan blade or propeller for producing gas flow, or an impeller for producing liquid flow.

The HVAC system 100 also includes a filter element 116 positioned between the fluid inlet 104 and the fluid outlet 106 for removing particulates from the fluid. The fluid flows through the filter element 116 as indicated in FIG. 2, and the filter element 116 filters particulates from the fluid as the fluid flows through the filter element 116. The filter element 116 is preferably located between the fluid inlet 104 and the fluid flow producing device 112 as shown in FIG. 2 such that particulates are removed from the fluid by the filter element 116 before the fluid reaches the flow producing device 112. The filter element 116 is preferably removable for cleaning and/or replacement.

In one embodiment, the HVAC system 100 includes the fluid flow producing device 112 is a fan for moving air through the HVAC system. The filter element 116 filters airborne particulates such as dust and pollen from the air as the air moves through the filter element 116. In another embodiment, the HVAC system 100 is in the form of a fluid delivery system that includes a liquid pumping system (not shown). The fluid flow producing device 112 and the motor 108 form a pump for moving the liquid through the liquid pumping system. The filter element 116 filters particulates suspended in the liquid from the liquid as liquid flows through the filter element 116.

The HVAC system 100 also includes a filter condition indicating system 118 including a filter condition sensing circuit 120 in communication with the control device 12 and coupled to a filter status indicator 122. In general, the a filter condition sensing circuit 120 determines a condition of the filter element 116 based on signals received from the current sensor 124 and the voltage sensor 126 and sends a signal 130 to the filter status indicator 122 indicative of the condition of the filter element 116. In one embodiment, the filter condition sensing circuit 120 may communicate sensor signals to the control device 12 for determining performance of the filter element, and inherently of the HVAC system 100 or the HVAC system.

In general, the filter status indicator 122 indicates the condition of the filter element 116 (e.g., to a user or any interconnecting device such as the central server 26). The filter status indicator 122 may include, for example, a green indicator lamp or light-emitting diode and a red indicator lamp or light-emitting diode. When the condition of the filter element 116 is normal (i.e., not overly restrictive), the green indicator lamp or light-emitting diode may be illuminated, and the red indicator lamp or light-emitting diode may not be illuminated. On the other hand, when the condition of the filter element 116 is abnormal (i.e., overly restrictive), the red indicator lamp or light-emitting diode may be illuminated, and the green indicator lamp or light-emitting diode may not be illuminated.

As indicated in FIG. 2, the filter condition sensing circuit 120 includes the current sensor 124, the voltage sensor 126, and a computer processor 14. In the embodiment of FIG. 2, the current sensor 124 is coupled into to the conductor 114B such that the current sensor 124 is located in an electrical current path of the motor 108. The current sensor 124 senses (or, measures) a magnitude of electrical current provided to the motor 108, and produces a signal indicative of the magnitude of electrical current provided to the motor 108. The current sensor 124 provides a signal to the computer processor 14.

The a.c. electrical current I provided to the motor 108 is expectedly sinusoidal, and given by:

$$I = I_{MAX} \sin(2\pi ft)$$

where $I_{MAX}$ is a maximum amplitude of the a.c. current, f is the frequency of the a.c. current (e.g., 60 Hz), and t=time. In contemplated embodiments, the signal produced by the current sensor 124 is indicative of the maximum amplitude of the a.c. current $I_{MAX}$ provided to the motor 108.

The voltage sensor 126 is connected to each of the conductors 114A and 114B providing electrical power to the motor 108. The voltage sensor 126 senses (or, measures) a magnitude of electrical voltage provided to the motor 108 via the pair of conductors 114A and 114B, and produces a signal indicative of the magnitude of electrical voltage provided to the motor 108. The voltage sensor 126 provides the signal to the computer processor 14.

The a.c. electrical voltage V provided to the motor 108 is expectedly sinusoidal, and given by:

$$V = V_{MAX} \sin(2\pi ft)$$

where $V_{MAX}$ is a maximum amplitude of the a.c. voltage, f is the frequency of the a.c. voltage (e.g., 60 Hz), and t=time. In contemplated embodiments, the signal produced by the voltage sensor 126 is indicative of the maximum amplitude of the a.c. voltage $V_{MAX}$ provided to the motor 108.

The computer processor 14 may use the signals from the current sensor 124 and the voltage sensor 126 to produce the signal 130 sent to the filter status indicator 122. Alternately, the computer processor 14 may use the signals from the current sensor 124 and the voltage sensor 126 to produce an output signal, and the output signal may be used to produce the signal 130. The computer processor 14 may communicate the signals to the control device 12 for determining performance of the HVAC system 100.

Figure 3:
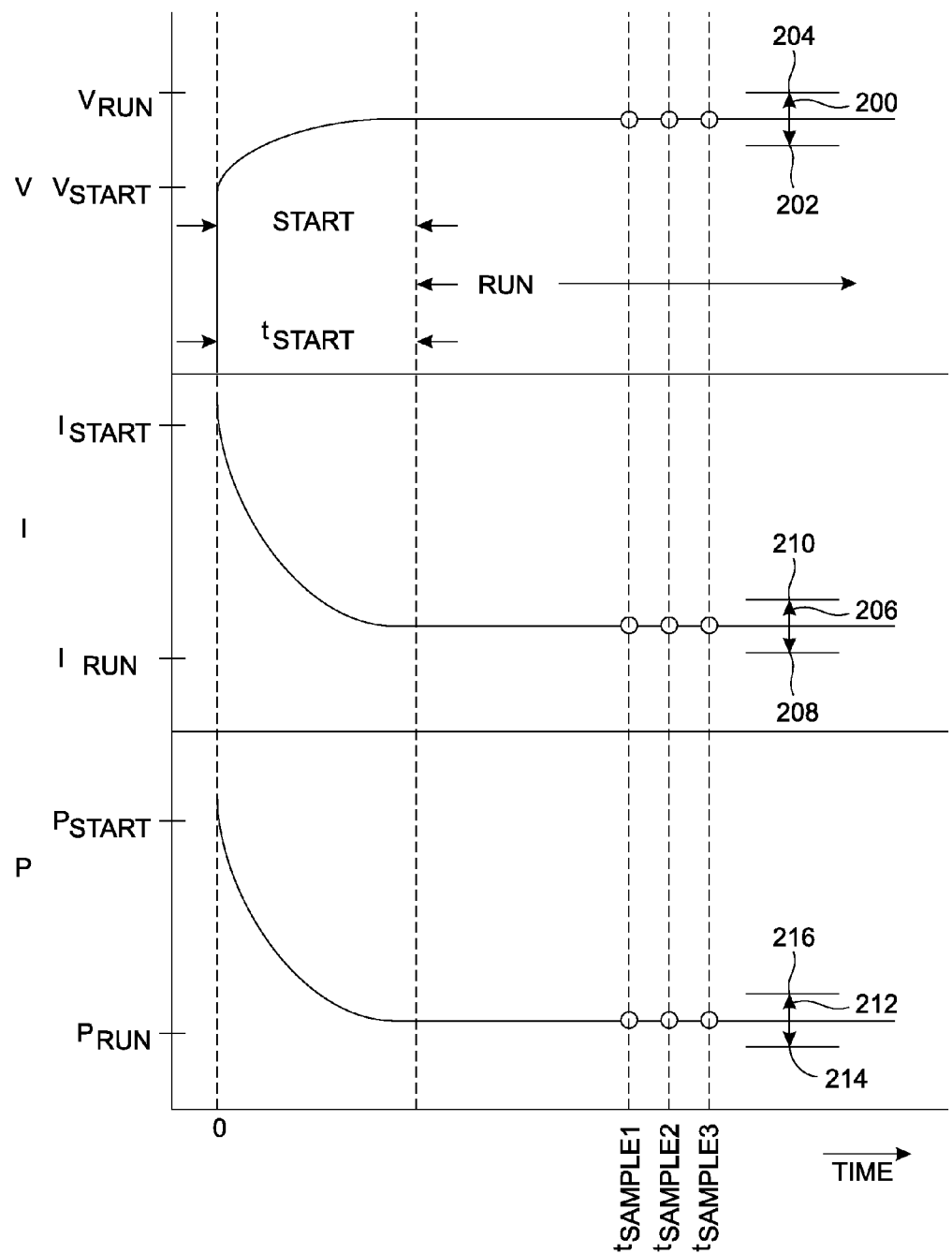
FIG. 3 is a graph of electrical voltage provided to, and electrical current and power required by, the motor of FIG. 2 versus time while the motor is operating.

FIG. 3 is a graph of electrical voltage provided to, and electrical current and power required by, the motor 108 of FIG. 2 versus time while the motor 108 is operating. Referring to FIGS. 2 and 3, during a first portion of the time the motor 108 is operating, $t_{START}$, the motor 108 is starting. After the motor 108 starts, the motor 108 is running for the remainder of the time the motor 108 is operating.

Single phase a.c. induction motors are commonly used in fans and pumps. Accordingly, in the embodiment of FIGS. 2 and 3, motor 108 is a single phase a.c. induction motor having a rotor positioned within a surrounding stator. The stator contains a number of conductor windings. When a.c. electrical voltage is applied to the windings, an a.c. electrical current flows through the windings, and a moving magnetic field is created around the stator. The magnetic field created by the stator induces a current in the rotor, and the current in the rotor creates a second magnetic field about the rotor. The interaction of the two magnetic fields produces a torque on the rotor, causing the rotor to rotate with respect to the stator. The frequency of the a.c. electrical power provided to the stator determines a rate at which the magnetic field about the stator changes, and thus a maximum speed at which the rotor rotates within the stator.

When the a.c. electrical power is first applied to the motor 108, the rotor is not yet turning, and the electrical impedance of the motor 108 is relatively low. The initial starting current (the locked rotor current) of an a.c. induction motor is typically about 6 times the run current (the full load amps or FLA). As the rotor of the motor 108 starts to turn, the electrical impedance of the motor 108 increases, and the alternating current drawn by the motor 108 decreases as indicated in FIG. 3.

Conductors 114 providing a.c. electrical power from the a.c. power source 110 in FIG. 2 to the motor 108, including the conductors 114A and 114B, have a certain amount of electrical resistance. (The conductors 114 also have electrical inductance, but the inductance of the conductors 114 may be ignored.) Current provided to the motor 108 via the conductors 114 causes a voltage drop across the conductors 114, and the a.c. voltage at the motor 108 is the source a.c. voltage at the a.c. power source 110 minus the voltage drop across the conductors 114. A typical electrical power distribution system is designed such that the voltage drop between the a.c. power source 110 and the motor 108 is less than 5 percent, and typically 3 percent.

The higher starting current of the motor 108 causes a greater voltage drop in the conductors 114 providing the a.c. power from the a.c. power source 110 to the motor 108. As a result, the a.c. voltage provided to the motor 108 when the motor 108 is starting is reduced as indicated in FIG. 3. For example, the initial starting voltage provided to the motor 108 may be about 75 percent of the a.c. voltage at the a.c. power source 110 in FIG. 2.

After the motor 108 has started (i.e., when the motor 108 is running), the a.c. voltage provided to, and the a.c. current required by, the motor 108 are fairly constant as indicated in FIG. 3.

In a single phase a.c. system where a.c. voltage and a.c. current are provided to an electrical load, and the a.c. voltage and the a.c. current are not in phase (i.e., the load is reactive), the apparent power delivered to the load is the product of the root mean square (RMS) values of the a.c. voltage ($V_{RMS}$) and the a.c. current ($I_{RMS}$):

$$P_{APPARENT} = V_{RMS} \cdot I_{RMS}$$

where $V_{RMS} = 0.707 \cdot V_{MAX}$ and $I_{RMS} = 0.707 \cdot I_{MAX}$, and $$P_{APPARENT} = 0.5 \cdot V_{max} \cdot I_{max}$$

The average or real power delivered to the load is:

$$P_{AVERAGE} = V_{RMS} \cdot I_{RMS} \cdot \cos\theta = 0.5 \cdot V_{max} \cdot I_{max} \cdot \cos\theta$$

where θ is the phase angle between the a.c. voltage and the a.c. current. The factor (cos θ) is called the power factor.

In FIG. 3, and for the purposes described herein, electrical power P required by the motor 108 is generally given by:

$$P = k \cdot V_{max} \cdot I_{max}$$

where k can be any selected number. The factor k may be selected to be, for example, a number greater than 0 and less than or equal to 1. When k=0.5, P is a measure of apparent power.

While the factor k may be fixed for convenience, the factor k need not be constant. For example, when k=0.5·cos θ, and phase angle θ between the a.c. voltage and the a.c. current varies, P is a measure of average power.

As indicated in FIG. 3, the motor 108 requires (i.e., draws) more electrical power when starting than when running. It is noted that the power factor (cos θ) of motor 108 is expectedly less then 1.0 when motor 108 is running (i.e., after the motor 108 has started), and even lower when motor 108 is starting. For example, the initial starting power factor (cos θ) of motor 108 may be about 0.64, and may increase to approximately 0.8 when motor 108 is running.

As indicated in FIG. 3, the a.c. voltage provided to the motor 108 when running varies within an acceptable a.c. voltage range 200. The acceptable a.c. voltage range 200 is defined to be between a minimum acceptable a.c. voltage 202 and a maximum acceptable a.c. voltage 204.

For example, a nominal value of a.c. voltage provided to the motor 108 when running may be a nominal value of the a.c. voltage at the a.c. power source 110 minus the voltage drop across the conductors 114 providing the a.c. electrical power from the a.c. power source 110 to the motor 108 (typically 3 percent). The nominal value of the a.c. voltage at the a.c. power source 110 (e.g., from an electric utility) may vary by, for example, plus or minus 5 percent. Thus the minimum acceptable a.c. voltage 202 may be the nominal value of the a.c. voltage at the a.c. power source 110 minus 8 percent, and the maximum acceptable a.c. voltage 204 may be the nominal value of the a.c. voltage at the a.c. power source 110 plus 2 percent.

Similarly, the a.c. current required by the motor 108 when running varies within an acceptable a.c. current range 206 as indicated in FIG. 3. The acceptable a.c. current range 206 is defined to be between a minimum acceptable a.c. current 208 and a maximum acceptable a. c. current 210.

During normal operation, the a.c. current required by the motor 108 when running is largely dependent on the a.c. voltage provided to the motor 108 and the condition of the filter element 116 of FIG. 2. When the a.c. voltage provided to the motor 108 is fairly constant over time, the a.c. current required by the motor 108 when running is largely dependent on the condition of the filter element 116. In general, as particulates trapped in the filter element 116 impede the flow of fluid through the filter element 116, the mechanical load on the motor 108 is reduced, and the magnitude of a.c. current required by the motor 108 decreases.

Further, the a.c. power required by the motor 108 when running varies within acceptable a.c. power range 212 as indicated in FIG. 3. The acceptable a.c. power range 212 is defined to be between a minimum acceptable a.c. power 214 and a maximum acceptable a.c. power 216. By definition, the a.c. power required by the motor 108 when running is dependent on the a.c. voltage provided to, and the a.c. current required by, the motor 108 when running.

Like the a.c. current, the a.c. power required by the motor 108 when running during normal operation is largely dependent on the a.c. voltage provided to the motor 108 and the condition of the filter element 116 of FIG. 2. When the a.c. voltage provided to the motor 108 is fairly constant over time, the a.c. power required by the motor 108 when running is largely dependent on the condition of the filter element 116. In general, as particulates trapped in the filter element 116 impede the flow of fluid through the filter element 116 and the mechanical load on the motor 108 is reduced as a result, the magnitude of a.c. power required by the motor 108 decreases.

In the embodiment described below, the acceptable a.c. voltage range 200 and the acceptable a.c. power range 212 are determined during an initialization phase of the filter condition sensing circuit 120 which precedes a normal operation phase of the filter condition sensing circuit 120.

That is, the minimum acceptable a.c. voltage 202, the maximum acceptable a.c. voltage 204, the minimum acceptable a.c. power 214, and the maximum acceptable a.c. power 216 are determined during the initialization phase.

Figure 4A:
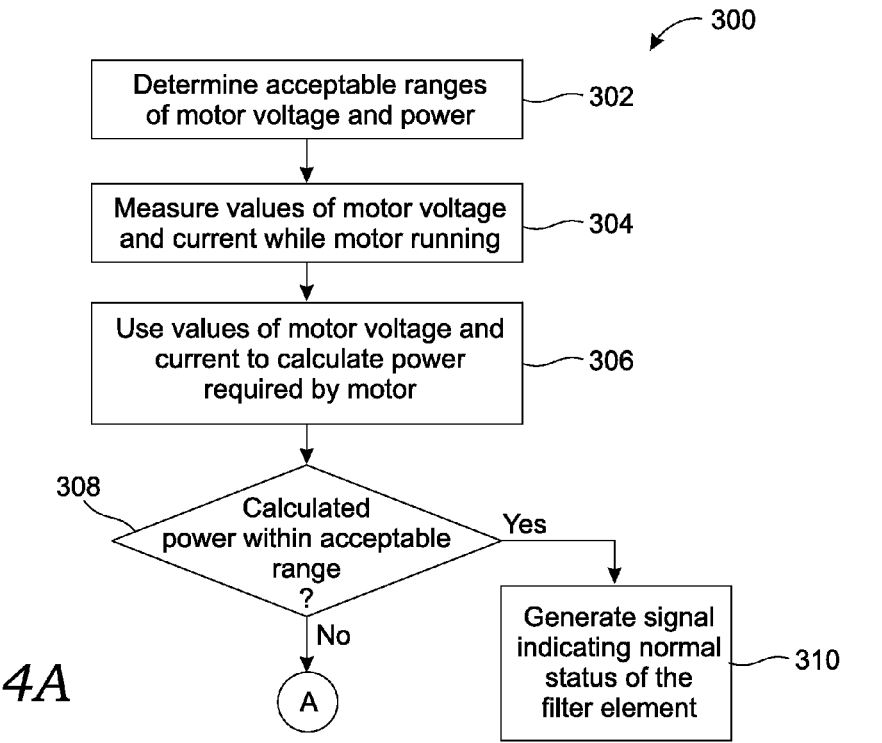
FIG. 4A is a first part of a flow diagram illustrating the operation of the system of FIG. 1 for determining a condition of a filter element.
Figure 4B:
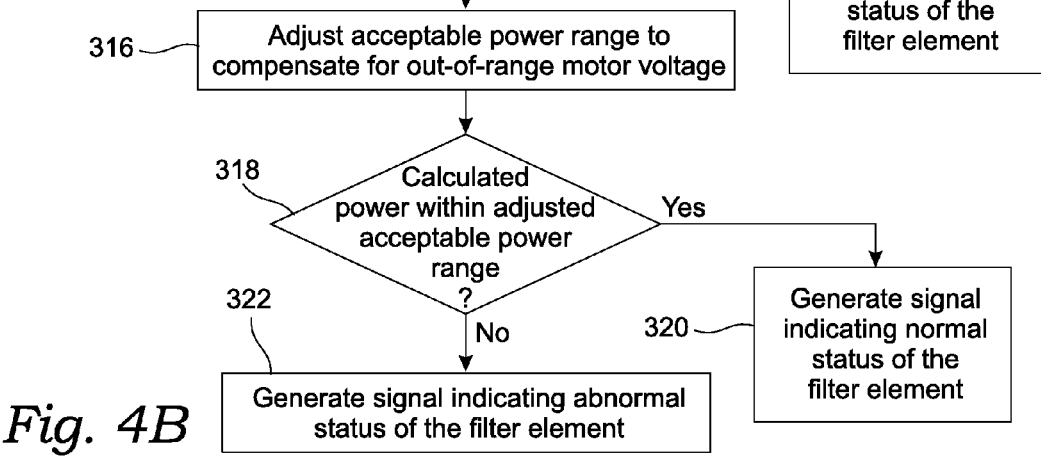
FIG. 4B is a second part of a flow diagram illustrating the operation of the system of FIG. 1 for determining a condition of a filter element.

FIGS. 4A-4B in combination form a flow chart of a method 300 for determining a condition of a filter element (e.g., a condition of the filter element 116 of FIG. 2). In one embodiment, the computer processor 14 of FIG. 2 carries out the method 300. During a first step 302 of the method 300, acceptable ranges of motor voltage and power (e.g., the acceptable a.c. voltage range 200 and the acceptable a.c. power range 212) are determined. The step 302 is preferably performed during the initialization phase of the filter condition sensing circuit 120 of FIG. 2 which precedes the normal operation phase of the filter condition sensing circuit 120.

As described above, the signal produced by the current sensor 124 and provided to the computer processor 14 is indicative of the a.c. current required by the motor 108, and the signal produced by the voltage sensor 126 and provided to the computer processor 14 is indicative of the a.c. voltage provided to the motor 108. In some embodiments, the signal produced by the current sensor 124 is indicative of the maximum a.c. current $I_{MAX}$ provided to the motor 108, and the signal produced by the voltage sensor 126 is indicative of the maximum a.c. voltage $V_{MAX}$ provided to the motor 108.

Each time the motor 108 operates, the computer processor 14 may sample the signals from the current sensor 124 and the voltage sensor 126 at different times while the motor 108 is running, and average the samples to reduce measurement errors. For example, in one embodiment depicted in FIG. 2, the computer processor 14 samples the signals from the current sensor 124 and the voltage sensor 126 at times $t_{SAMPLE1}$, $t_{SAMPLE2}$, and $t_{SAMPLE3}$, where $t_{SAMPLE1} > t_{START}$, $t_{SAMPLE2} > t_{SAMPLE1}$, and $t_{SAMPLE3} > t_{SAMPLE2}$. Time $t_{SAMPLE1}$ is preferably long enough after $t_{START}$ to allow the motor 108 voltage and current to stabilize as indicated in FIG. 2. Time $t_{SAMPLE1}$ may be, for example, a few seconds after $t_{START}$. The 3 motor voltage samples may be averaged to form an a.c. voltage value, and the 3 motor current samples may be averaged to form an a.c. current value.

In one embodiment, the following pseudocode may be used to describe one method of determining the minimum acceptable a.c. voltage 202 and the maximum acceptable a.c. voltage 204 defining the acceptable a.c. voltage range 200, and the minimum acceptable a.c. power 214 and the maximum acceptable a.c. power 216 defining the acceptable a.c. power range 212.

```
/*initialization*/
min_acceptable_voltage=100000;
max_acceptable_voltage=0;
min_acceptable_power=100000;
max_acceptable_power=0;
while(motor_operating) {
  /*wait until after motor starts*/
  wait(tsample1); /*tsample1>tstart*/
  /*get 3 samples of voltage and current*/
  voltage_sample1=sample(signal_from_voltage_sensor);
  current_sample1=sample(signal_from_current_sensor);
  voltage_sample2=sample(signal_from_voltage_sensor);
  current_sample2=sample(signal_from_current_sensor);
```

```
voltage_sample3=sample(signal_from_voltage_sen-
    sor);
current_sample3=sample(signal_from_current_sen-
    sor);
/*average values to reduce measurement errors*/
voltage_value=(voltage_sample1+voltage_sample2+
    voltage_sample3)/3;
current_value=(current_sample1+current_sample2+
    current_sample3)/3;
/*update    min_acceptable_voltage    and    max_
    acceptable_voltage*/
if(voltage_value<min_acceptable_voltage)
    min_acceptable_voltage=voltage_value;
if(voltage_value>max_acceptable_voltage)
    max_acceptable_voltage=voltage_value;
/*calculate power delivered to motor while running*/
power
power=k*voltage_value*current_value);
/*update    min_acceptable_power    and    max_
    acceptable_power*/
if(power<min_acceptable_power)
    min_acceptable_voltage=power;
if(power>max_acceptable_power)
    max_acceptable_voltage=power;
}
```

The initialization phase or "learn period" of the filter condition sensing circuit 120 of FIG. 2, during which the acceptable ranges of motor voltage and power are determined, is preferably carried out over several hours of operation of the motor 108. For example, the learn period may occur over a period of time during which the motor 108 operates for between 6 and 10 hours.

The learn period preferably occurs after a new filter element 116 is installed and a control system of the HVAC system 100 of FIG. 2 is reset. In one embodiment, the filter status indicator 122 of FIG. 2 includes a red lamp or light-emitting diode and a green lamp or light-emitting diode, and during the learn period the red and green lamps or light-emitting diodes are illuminated alternately.

Values of motor voltage and current are obtained while the motor 108 is running during a step 304. This may be carried out by sampling the signals from the current sensor 124 and the voltage sensor 126 at 3 different times while the motor 108 is running as shown in FIG. 3 and described above, and averaging the samples to reduce measurement errors.

During a step 306, the values of the motor voltage and current obtained during the step 304 are used to calculate the power required by the motor 108. The power calculation may be carried out as described above.

During a decision step 308, a determination is made as to whether the calculated power required by the motor 108 is within the acceptable power range (e.g., the acceptable a.c. power range 212 of FIG. 3). That is, a determination is made as to whether the calculated power required by the motor 108 is greater than or equal to a minimum acceptable power value (e.g., the minimum acceptable a.c. power 214 of FIG. 3), and less than or equal to a maximum acceptable power value (e.g., the maximum acceptable a.c. power 216 of FIG. 3).

If the calculated power required by the motor 108 is determined to be within the acceptable power range during the decision step 308, a signal is generated during a step 310 indicating a normal (i.e., not overly restrictive) status of the filter element 116. The signal may be, for example, provided to a filter status indicator (e.g., the filter status indicator 122 of FIG. 2). In response to the signal, the filter status indicator 122 may display a normal status of the filter element 116 (e.g., illuminate a green lamp or light-emitting diode).

On the other hand, if the calculated power required by the motor 108 is not within the acceptable power range during the decision step 308, a decision step 312 is performed next. During the decision step 312, a determination is made as to whether the motor voltage is within the acceptable voltage range (e.g., the acceptable a.c. voltage range 200 of FIG. 3). That is, a determination is made as to whether the motor voltage is greater than or equal to a minimum acceptable voltage value (e.g., the minimum acceptable a.c. voltage 202 of FIG. 3), and less than or equal to a maximum acceptable voltage value (e.g., the maximum acceptable a.c. voltage 204 of FIG. 3).

If the motor voltage is determined to be within the acceptable voltage range during the decision step 312, a signal is generated during a step 314 indicating an abnormal (i.e., overly restrictive) status of the filter element 116. The signal may be, for example, provided to the filter status indicator (e.g., the filter status indicator 122 of FIG. 2). In response to the signal, the filter status indicator 122 may display an abnormal status of the filter element 116 (e.g., illuminate a red lamp or light-emitting diode).

On the other hand, if the voltage provided to the motor is not within the acceptable voltage range during the decision step 312, a step 316 is performed next. During the step 316, the acceptable power range is adjusted to compensate for the out-of-range motor voltage.

For example, of the motor voltage is less than the minimum acceptable voltage value (e.g., the minimum acceptable a.c. voltage 202 of FIG. 3), the minimum acceptable power value (e.g., the minimum acceptable a.c. power 214 of FIG. 3) may be adjusted to compensate for the out-of-range motor voltage. In one embodiment, the minimum acceptable power value is adjusted by multiplying the minimum acceptable power value by a ratio of the motor voltage to the minimum acceptable voltage value:

minimum_acceptable_power=minumum_
    acceptable_power*(voltage_value/minimum_ac-
    ceptable_voltage)

Similarly, when the motor voltage is greater than the maximum acceptable voltage value (e.g., the maximum acceptable a.c. voltage 204 of FIG. 3), the maximum acceptable power value may be adjusted by multiplying the maximum acceptable power value by a ratio of the motor voltage to the maximum acceptable voltage value:

maximum_acceptable_power=maximum_
    acceptable_power*(voltage_value/maximum_ac-
    ceptable_voltage)

During a decision step 318, a determination is made as to whether the calculated power required by the motor 108 is within the adjusted acceptable power range. That is, a determination is made as to where the calculated power required by the motor 108 is greater than or equal to the minimum acceptable power value, and less than or equal to the maximum acceptable power value.

If the calculated power required by the motor 108 is determined to be within the adjusted acceptable power range during the decision step 318, the signal indicating the normal (i.e., not overly restrictive) status of the filter element 116 is generated during a step 320. The signal may be, for example, provided to the filter status indicator (e.g., the filter status indicator 122 of FIG. 2). In response to the signal, the filter status indicator 122 may display the normal status of the filter element 116 (e.g., illuminate the green lamp or light-emitting diode).

On the other hand, if the motor voltage is determined to be outside of the adjusted acceptable voltage range during the decision step 318, the signal indicating the abnormal (i.e., overly restrictive) status of the filter element 116 is generated during a step 322. The signal may be, for example, provided to the filter status indicator (e.g., the filter status indicator 122 of FIG. 2). In response to the signal, the filter status indicator 122 may display the abnormal status of the filter element 116 (e.g., illuminate the red lamp or light-emitting diode). The computer processor 14 of FIG. 2 may also store a pre-programmed current threshold value. Following the initialization phase or learn period, the value of motor current obtained while the motor is running (e.g., during the step 304 above) may be compared to the pre-programmed current threshold value. In one embodiment, the filter status indicator 122 of FIG. 2 includes the red lamp or light-emitting diode and the green lamp or light-emitting diode as described above. If the motor current value is greater than the pre-programmed current threshold value, the signal 130 from the computer processor 14 may cause the filter status indicator 122 to flash the red lamp or light-emitting diode on and off.

Figure 5:
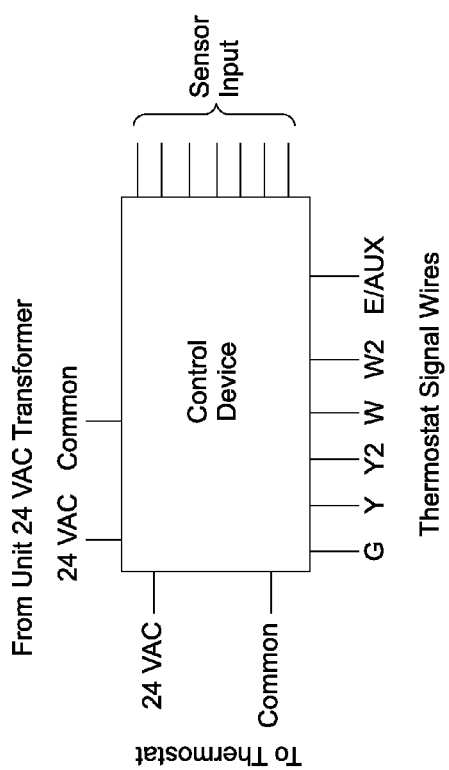
FIG. 5 is a diagram of a control device illustrating the operative connection of the control device with other elements of the system.

FIG. 5 is a diagram of the control device 12 illustrating the operative connection of the control device with other elements of the system. The control device 12 may be implemented by way of a single device (e.g., a computing device, a processor or an electronic storage device) or a combination of multiple devices that are operatively connected or networked together. The control device 12 may be implemented as any compatible hardware or a suitable combination of hardware and software. In some embodiments, the control device 12 may be a hardware device including processor(s), e.g., the processor 14, executing machine readable program instructions for monitoring and controlling circuits and sensors. The "hardware" may comprise a combination of discrete components, an integrated circuit, an application-specific integrated circuit, a field programmable gate array, a digital signal processor, or other suitable hardware. For example, the control device 12 may be implemented as a field programmable gate array (FPGA), an erasable programmable logic device (EPLD), a system on a chip (SOC), or any other type of device known in the art, related art, or developed later. The "software" may comprise one or more objects, agents, threads, lines of code, subroutines, separate software applications, two or more lines of code or other suitable software structures operating in one or more software applications or on one or more processors, e.g., the processor 14. The control device 12 may receive input from a variety of sensors (e.g., current sensor 124, voltage sensor 126, temperature sensors 22, etc.) and the thermostat 32. In response to the input, the control device 12 may provide an output to various devices such as the thermostat 32, the network device 28, the server 26, a display device such as a monitor (not shown), etc.

Figure 6:
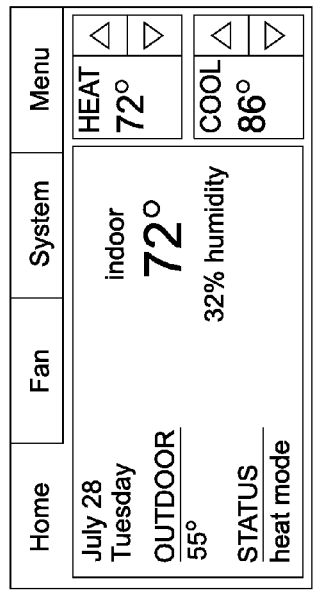
FIG. 6 is a front elevational view of one embodiment of a thermostat used in FIG. 1, illustrating a first display of the thermostat.

FIG. 6 is a front elevational view of one embodiment of the thermostat 32 used in FIG. 1, illustrating a first display of the thermostat 32. As shown in FIG. 6, the first display includes information of interest to a user, such as outdoor temperature, indoor temperature, humidity, and similar information (e.g., time and date). The first display may further include controls for setting a heating parameter, a cooling parameter, and any other similar controls desired by one skilled in the art.

Figure 7:
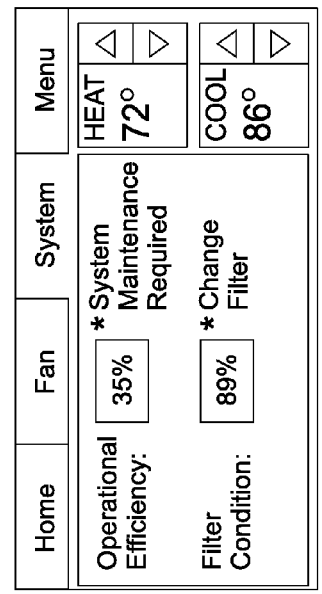
FIG. 7 is a front elevational view of the thermostat, illustrating a second display of the thermostat when system maintenance is required.

FIG. 7 is a front elevational view of the thermostat 32, illustrating a second display of the thermostat 32 when system maintenance is required. As shown in FIG. 7, when operational efficiency of the HVAC system (or inherently, the HVAC system 100) falls below a predetermined level, as discussed in greater detail below, a warning may be provided that system maintenance is required. Similarly, when a filter condition falls below a predetermined level, as discussed above, a warning may be provided to change the filter element 116. As discussed below, such warning may also be sent via email, text, and/or any other desired method of communications, to alert the user to the need for maintenance and/or repair of the HVAC system.

Figure 8:
FIG. 8 is a front elevational view of the thermostat, illustrating a third display of the thermostat when the system has been remotely shut down.

FIG. 8 is a front elevational view of the thermostat 32, illustrating a third display of the thermostat 32 when the HVAC system (or the HVAC system 100) has been remotely shut down. As shown in FIG. 8, when the HVAC system is remotely powered off, either for maintenance and/or repair, or as part of a demand control event, as discussed in greater detail below, a warning may be provided that the HVAC system has been shut down, along with further information and/or instructions. For example, if repair/maintenance is required, information in this regard may be provided, potentially along with instructions for repair/maintenance, advertisement(s) for service providers, etc.

Figure 9:
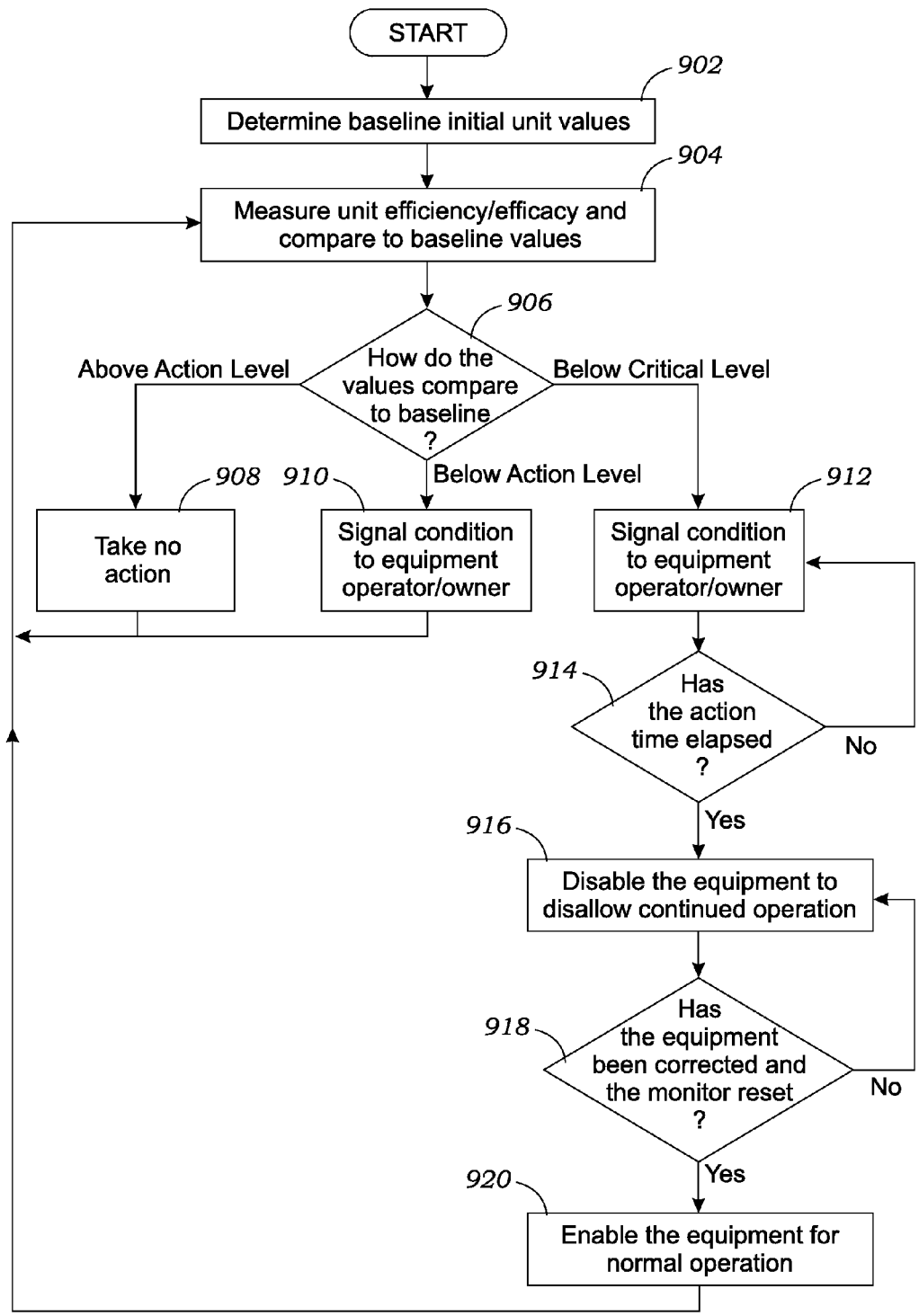
FIG. 9 is a flow diagram illustrating the operation of the system of FIG. 1 for determining the efficiency of the system.

FIG. 9 is a flow diagram illustrating the operation of the system of FIG. 1 for determining the efficiency of the system. As shown in FIG. 9, the system may be used to use a wide range of sensors, some of which are described above, to determine if system maintenance is required.

The exemplary method 900 may be described in the general context of computer executable instructions. Generally, computer executable instructions may include routines, programs, objects, components, data structures, procedures, modules, functions, and the like that perform particular functions or implement particular data types. The computer executable instructions may be stored on a computer readable medium, and installed or embedded in an appropriate device for execution. The order in which the method 900 is described is not intended to be construed as a limitation, and any number of the described method blocks may be combined or otherwise performed in any order to implement the method 900, or an alternate method. Additionally, individual blocks may be deleted from the method 900 without departing from the spirit and scope of the present disclosure described herein. Furthermore, the method 900 may be implemented in any suitable hardware, software, firmware, or combination thereof, that exists in the related art or that is later developed.

The method 900 describes, without limitation, implementation of the control device 12. Those having ordinary skill in the art would understand that the method 900 may be modified appropriately for implementation in a various manners without departing from the scope and spirit of the disclosure.

At step 902, baseline initial values are determined. In one embodiment, the control device 12 may store predetermined baseline or threshold values of various parameters that relate to the performance of one or more units, e.g., an indoor unit (not shown) and an outdoor unit (not shown) that may be associated with the HVAC system. The indoor unit may include various powered components such as, but not limited to, an indoor fan (not shown), a filter such as the filter 116, and a thermostat such as the thermostat 32. The outdoor unit may also include various powered components such as, but not limited to, a compressor (not shown), an outdoor fan (not shown), an evaporator coil (not shown), and a condenser coil (not shown). Each of these components may have a predetermined circuitry or a group of circuits including, but not limited to, those known in the art, related art, or developed art. The HVAC system may be in communication with a electrical grid providing current, voltage, or power to these components.

In another embodiment, after installation of the HVAC system 100, the control device 12 may monitor the efficiency/efficacy of the units to get the "as installed" baseline values of the parameters. The control device 12 may continue to monitor the efficiency/efficacy of the units, and therefore of the HVAC system 100, until stopped. In order to determine the operating efficiency/efficacy of the units, or the HVAC system 100, the control device 12 may utilize readings/calculations/values of any one or combination of the parameters. Examples of these parameters include, but are not limited to, Indoor Fan System Voltage, Current, Power, and/or Energy Usage; Outdoor Fan System Voltage, Current, Power, and/or Energy Usage; Indoor and/or Outdoor Fan System Vibrations or Harmonics; Evaporator Coil Entering and/or Leaving Air Temperature and/or Humidity; Evaporator Coil Entering and/or Leaving Refrigerant Temperature and/or Pressure; Supply Air Temperature and/or Humidity; Return Air Temperature and/or Humidity; Indoor Unit Voltage, Current, Power, and/or Energy Usage; Room Air Temperature and/or Humidity; Compressor Voltage, Current, Power, and/or Energy Usage; Compressor Harmonics; Condenser Coil Entering and/or Leaving Refrigerant Pressure and/or Temperature; Condenser Coil Entering and/or Leaving Air Temperature and/or Humidity; System Superheat and/or Sub-cooling Performance; Indoor Unit Supply Air Static Pressure; Indoor Unit Leaving Air Static Pressure; Duct Work Static Pressure; Room Air Temperature and/or Humidity; and/or any system parameter known in the art, related art, or contemplated later that can be construed by one skilled in the art to relate to system/component efficiency/efficacy.

At step 904, the efficiency/efficacy of each unit is measured and compared to the baseline values. The control device 12 may compare the measured parameter values, or the correspondingly determined efficiency/efficacy of either each unit or the complete HVAC system 100, with the baseline or threshold values stored in the computer memory 16.

Based on such comparison, the control device 12 may be configured to perform various actions at step 906. In one embodiment, the control device 12 may monitor the as-installed efficiency/efficacy of the HVAC system 100 and notify the user/owner when conditions exist that are detrimental to the system efficiency/efficacy exist. Conditions are determined to be detrimental when the system efficiency/efficacy falls below an "Action Level" (e.g., 90% of the as-installed efficiency/efficacy, or any other standard or measure that may be desired to be set by one skilled in the art).

If the determined parameter or efficiency/efficacy values of the units, or the HVAC system 100, is above the "Action Level" at step 908, no action is taken and the control device 12 returns to the step 904 to continue monitoring and comparing the parameter or efficiency/efficacy values. The "Action Level" is a predetermined value that may or may not be user adjustable. At step 910, if the parameter or efficiency/efficacy values of the units, or the HVAC system 100, is below the "Action Level," but above 90%, the control device 12 may generate a signal to the user so that a corrective action can be scheduled. The operator signal can be, but is not limited to, aural signals, light signals, electronic mail notification, SMS messages, voice cellular calls, voice land-line calls, or radio wave signals. The main purpose of this signal is to inform the user/owner that the system performance has degraded and that corrective measures are needed.

At step 912, if the parameter or efficiency/efficacy values of the units, or the HVAC system 100, is below 90%, the control device 12 may generate a signal to the user that a corrective action must be completed to continue system operation. The operator signal can be, but is not limited to, aural signals, light signals, electronic mail notification, SMS messages, voice cellular calls, voice land-line calls, or radio wave signals. The main purpose of the signal is to inform the user/owner that the system performance has degraded to an unacceptable level and that corrective measures must be taken before the timer expires.

At step 914, the control device 12 may start and monitor a timer (not shown) and wait for the corrective action to be taken by the user. If the timer duration has elapsed beyond a predefined threshold duration and the corrective measures have not been taken, the control device 12 may disable operation of at least one of the units or a component or the overall system at step 916. The control device 12 may then wait for the corrective action to be taken. The control device 12 may be reset and configured to determine whether the corrective action has been completed at step 918. If the corrective action is not completed within a predetermined time duration, the control device 12 may move back to step 916 to disable one or more units, components, the overall system, or any combination thereof in any order. However, if the control device 12 determines that the corrective action has been taken within a predetermined time duration, the control device 12 may enable one or more units, components, the overall system, or any combination thereof in any order for use and re-start the monitoring cycle by moving back to step 904.

Monitoring can be restarted with comparisons to the as-installed performance or to the after corrective action performance. One exemplary method may compare to the as-installed values. Notifications to the user/owner can include, but not be limited to, aural signals, light signals, electronic mail notification, SMS messages, voice cellular calls, voice land-line calls, or radio wave signals. The device can be constructed of any combination of electronic components including, but not limited to, numerical controllers, sequential circuits, relays, contactors, resistors, capacitors, voltage sensing devices, current sensing devices, pressure sensors, temperature sensors, humidity sensors, and/or switches. The device shall not be limited to the sensors listed here within or to the types of circuitry listed here within.

Figure 10:
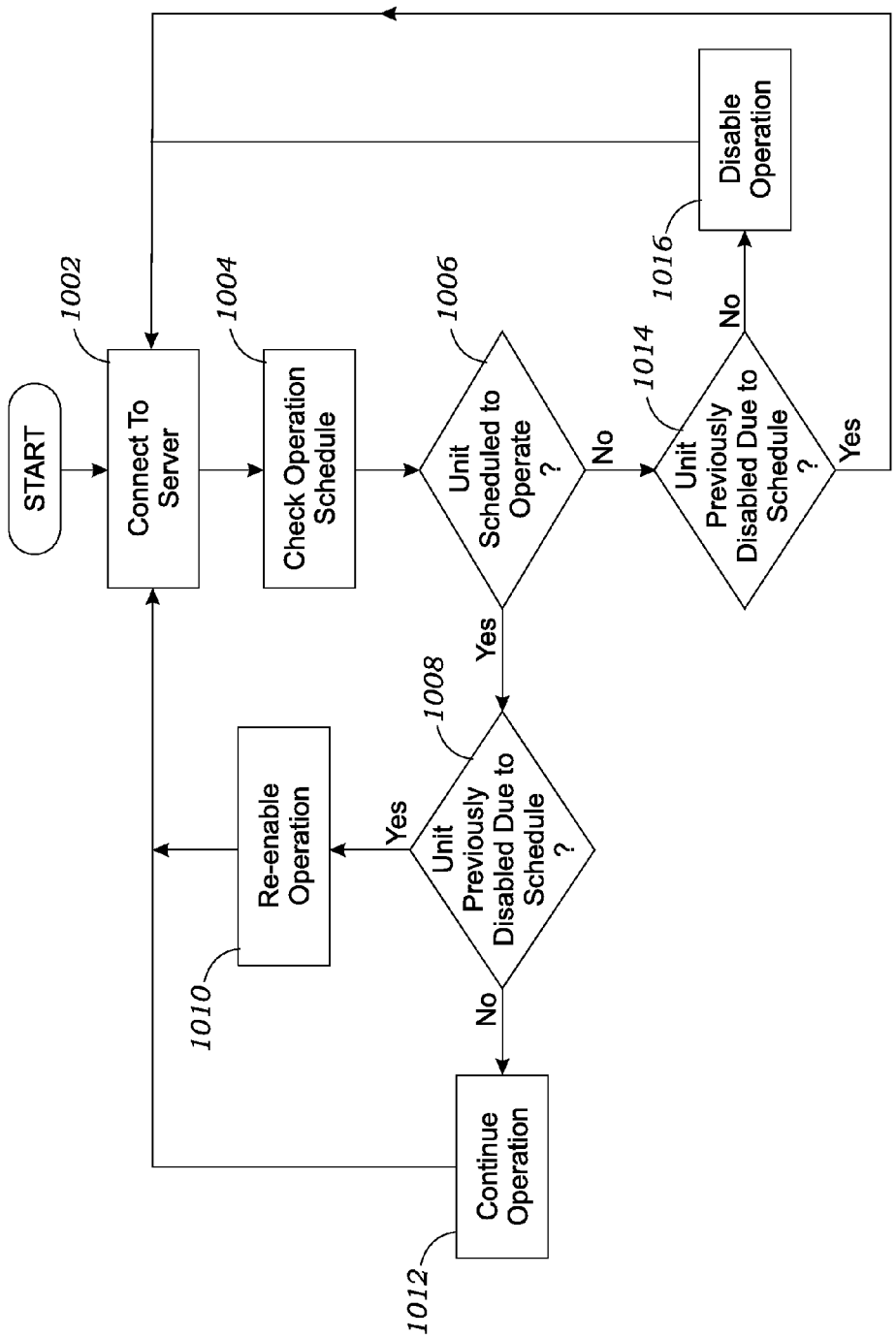
FIG. 10 is a flow diagram illustrating the operation of the system of FIG. 1 for determining if the system should be operating or shut down.

FIG. 10 is a flow diagram illustrating the operation of the system of FIG. 1 for determining if the system should be operating or shut down.

The exemplary method 1000 may be described in the general context of computer executable instructions. Generally, computer executable instructions may include routines, programs, objects, components, data structures, procedures, modules, functions, and the like that perform particular functions or implement particular data types. The computer executable instructions may be stored on a computer readable medium, and installed or embedded in an appropriate device for execution. The order in which the method 1000 is described is not intended to be construed as a limitation, and any number of the described method blocks may be combined or otherwise performed in any order to implement the method 1000, or an alternate method. Additionally, individual blocks may be deleted from the method 1000 without departing from the spirit and scope of the present disclosure described herein. Furthermore, the method 1000 may be implemented in any suitable hardware, software, firmware, or combination thereof, that exists in the related art or that is later developed.

The method 1000 describes, without limitation, implementation of the control device 12. Those having ordinary skill in the art would understand that the method 1000 may be modified appropriately for implementation in a various manners without departing from the scope and spirit of the disclosure. The control device 12 may include monitoring/controlling circuitry/sensors that are programmed, wired, and installed in a manner that allows for external control and monitoring via a network such as the internet utilizing cloud based data storage and control algorithms.

At step 1002, the control device 12 may connect to a central server 26 over a network such as the network 30, which may be a public network such as the Internet. The central server 26 may be a computing device having a computer processor, similar to the processor 14, and a computer memory, similar to the computer memory 16. The central server 26 may have a central program and a central database (not shown) operably installed on the computer memory of the central server 26. The central program of the central server 26 may receive data corresponding to (a) baseline or threshold values of various parameters including efficiency/efficacy of the HVAC system 100 itself or various units and components of the HVAC system 100 and (b) operation schedules of these units, components, and the overall HVAC system 100 from a local database (or, in typical embodiments, a large number of such device computers) or directly from a user via a suitable interface known in the art, related art, or developed later. The data may be updated in real time, or periodically, and may be transmitted in any manner known in the art (e.g., via a direct connection, LAN, Ethernet, USB line, or over the network, where the connection may either be physical or wireless). The data is stored in the central database, where it can then be compiled, analyzed, or otherwise used according to the needs of one skilled in the field.

At step 1004, the control device 12 may check for the operation schedule of various units, components, and the overall HVAC system 100 itself based on the data received from the central server 26 and may determine if a unit or component of the HVAC system 100 is scheduled for operation at step 1006.

If a unit or component of the HVAC system 100 is scheduled for operation, the control device checks if that unit or component is previously scheduled to be disabled according to the operation schedule at step 1008. If the unit or component was previously scheduled to be disabled, the control device 12 re-enables that unit or component of the HVAC system 100 at step 1010 and communicates the "re-enabled" status of the unit or component to the central server 26. Otherwise at step 1012, the control device 12 allows the unit or component to continue its ongoing operation and communicate the status of the unit or component to the central server 26.

However, if the control device 12 determines, at step 1006, that a unit or component is not scheduled for operation according to the operation schedule received from the central server 26, the control device 12 may check if that unit or component is previously scheduled to be disabled at step 1014. If that unit or component is previously scheduled to be disabled, the control device 12 and communicates the status of the unit or component to the central server 26. Otherwise at step 1016, the control device 26 may disable operation of the unit or component and communicate the "disabled" status of the unit or component to the central server 26.

The cloud based nature of the control device 12, while being in communication with the central server 26, allows for continual improvement of the control device operation without requiring reprogramming/rewiring/re-configuring the control device 12 after installation. The control device 12 has the ability to develop a baseline operational efficiency/efficacy for the monitored unit or component of the HVAC system 100 to aid in the determination of whether or not the monitored unit or component should be disabled to reduce electrical grid loading. The control device 12 has the ability to be disabled if operational efficiency/efficacy has fallen below prescribed performance levels. The control device 12 has the ability to be remotely scheduled for periods of operation based on the electrical grid loading. The control device 12 reduces the need for whole building electrical disconnection to reduce electrical grid loading rather implementing high load unit or component disabling and leaving other lower loading unit or component untouched. The control device 12 operates over existing network topologies including Ethernet and the World Wide Web and does not require a specialized networking controller. Implementation of the control device 12 does not require modification or obsolescence of existing electrical device controllers. Implementation of the control device 12 does not require modifications to the existing electrical distribution grid or its control devices/structures.

One embodiment of the present subject matter provides a method for controlling an energy demand by an HVAC (heating, ventilation, air conditioning, and refrigeration) system including a plurality of powered components in communication with a electrical grid, the method comprising: receiving, using a transceiver on a control device in operable connection with the HVAC system 100 and having a processor and a computer memory, values of one or more parameters related to performance of the plurality of powered components being powered by the electrical grid; comparing, using the processor on the control device, the received values with corresponding predetermined threshold values stored in the computer memory for each of the plurality of powered components; determining, using the processor on the control device, overloading of the electrical grid by a powered component among the plurality of powered components based on respective values of one or more parameters being less than the corresponding predetermined threshold values for the powered component; and selectively controlling, using the processor on the control device, the operation of the powered component based on the electrical grid determined to be overloaded without disrupting operation of the remaining plurality of powered components being powered by the electrical grid.

One aspect of the embodiment provides the one or more parameters being selected from a group of parameters including voltage, current, power, energy usage, harmonics, temperature, humidity, and pressure.

In a still another aspect of the embodiment provides the control device being in communication with a server over a public network, wherein the control device is controlled by the central server. In a further aspect of the embodiment provides for disabling the operation of the powered component based on the electrical grid determined to be overloaded without disrupting the operation of the remaining plurality of powered components being powered by the electrical grid.

In another aspect of the embodiment provides for selectively controlling the operation of at least one circuit among a plurality of circuits associated with the powered component based on the electrical grid determined to be overloaded without disrupting the operation of the remaining plurality of circuits being powered by the electrical grid.

In yet another aspect of the embodiment provides for disabling the operation of the at least one circuit among the plurality of circuits associated with the powered component based on the electrical grid determined to be overloaded without disrupting the operation of the remaining plurality of circuits being powered by the electrical grid.

In still another aspect of the embodiment provides for the step of controlling to define periods of operation for the powered component or the at least one circuit associated with the powered component. In a further aspect of the embodiment provides for the at least one circuit has higher priority than the remaining plurality of circuits, where a priority associated with each of the plurality of circuits is stored in the computer memory of the control device. In another aspect of the embodiment provides for the powered component being selectively controlled to adjust the respective values of one or more parameters within an acceptable range of values that are predefined and stored in the computer memory.

As used in this application, the terms computer, processor, memory, and other computer related components, are hereby expressly defined to include any arrangement of computer(s), processor(s), memory device or devices, and/or computer components, either as a single unit or operably connected and/or networked across multiple computers (or distributed computer components), to perform the functions described herein.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A method for monitoring and controlling an energy demand by an HVAC system including a plurality of powered components in communication with an electrical grid, the method comprising the steps of:

receiving, in a control device in operable connection with the HVAC system and having a computer processor and a computer memory, values of one or more parameters related to performance of the plurality of powered components being powered by the electrical grid;

comparing, using the computer processor of the control device, the received values with corresponding predetermined threshold values stored in the computer memory of the control device for each of the plurality of powered components;

determining, using the computer processor of the control device, overloading of the electrical grid by a powered component among the plurality of powered components based on respective values of one or more parameters being less than the corresponding predetermined threshold values for the powered component;

selectively controlling, using the computer processor of the control device, the operation of the powered component based on the electrical grid determined to be overloaded without disrupting operation of the remaining plurality of powered components being powered by the electrical grid; and determining a power shortage in the electrical grid via a central server, determining a priority of the HVAC system based upon the values determined for that HVAC system relative to other HVAC systems using the electrical grid, and turning off a compressor of the HVAC system in the event of a power shortage based upon the priority determined.

2. The method of claim 1, wherein the one or more parameters include at least one of the following: voltage, current, power, energy usage, harmonics, temperature, humidity, or pressure.

3. The method of claim 1, wherein the control device is in communication with a server over a network, wherein the control device is controlled by the server.

4. The method of claim 1, wherein the powered component is selectively controlled to adjust the respective values of one or more parameters within an acceptable range of values that are predefined and stored in the computer memory.

5. The method of claim 1, further comprising the steps of determining a power shortage in the electrical grid via a central server, determining a priority of the HVAC system based upon the values determined for that HVAC system relative to other HVAC systems using the electrical grid, and turning off a compressor of the HVAC system in the event of a power shortage based upon the priority determined.

6. A system for monitoring and controlling demand for energy of an HVAC system including a plurality of powered components being powered by an electrical grid, the system comprising:

a control device that is operably engaged with the HVAC system, the control device including a computer processor and a computer memory, wherein the control device is configured to perform the steps of:

receiving values of one or more parameters related to performance of the plurality of powered components;

comparing the received values with corresponding predetermined threshold values stored in the computer memory of the control device for each of the plurality of powered components;

determining overloading of the electrical grid by a powered component among the plurality of powered components based on respective values of one or more parameters for the powered component being less than the corresponding predetermined threshold values;

selectively controlling the operation of the powered component based on the electrical grid determined to be overloaded without disrupting operation of the remaining plurality of powered components being powered by the electrical grid; and determining a power shortage in the electrical grid via a central server, determining a priority of the HVAC system based upon the values determined for that HVAC system relative to other HVAC systems using the electrical grid, and turning off a compressor of the HVAC system in the event of a power shortage based upon the priority determined.

7. The system of claim 6, wherein the one or more parameters are selected from a group of parameters including voltage, current, power, energy usage, harmonics, temperature, humidity, and pressure.

8. The system of claim 6, wherein the system further includes a plurality of temperature sensors that are operably installed for monitoring temperatures in and around the HVAC system, and the control device performs the steps of:

receiving temperature readings from the plurality of temperature sensors;

determining, from the temperature readings, the operational efficiency of the HVAC system; and selectively controlling the operation of the HVAC system to turn off power to at least some of the powered components in the event that the operational efficiency of the HVAC system drops below a threshold efficiency.

\* \* \* \* \*